(No Model.) 2 Sheets—Sheet 1.
J. H. STICH.
MEAT CHOPPER.
No. 537,316. Patented Apr. 9, 1895.
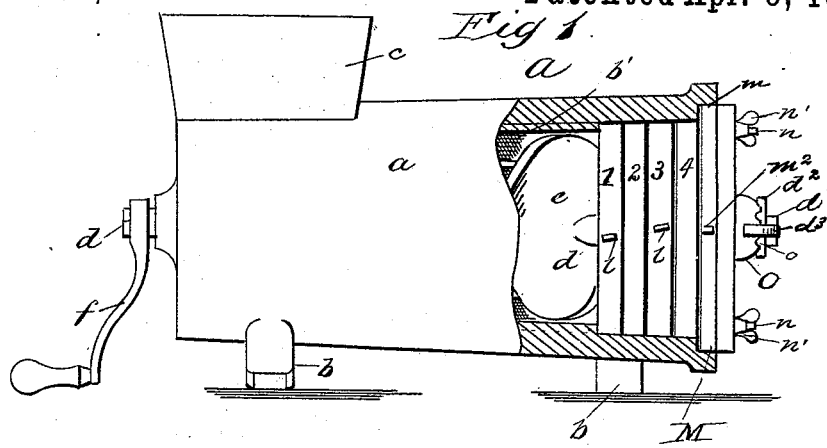
Fig. 1.
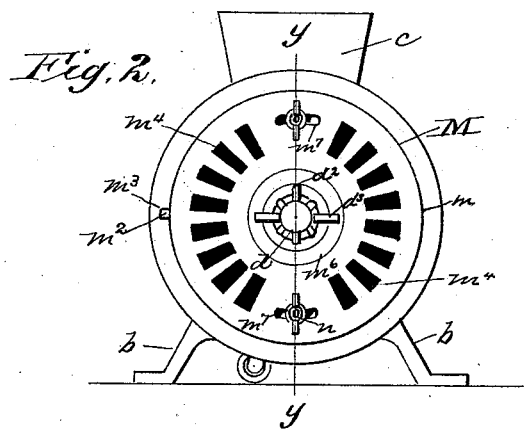
Fig. 2.
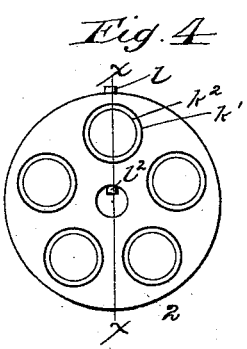
Fig. 4.
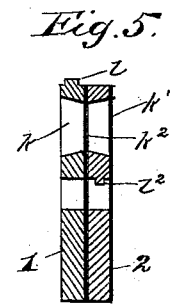
Fig. 5.
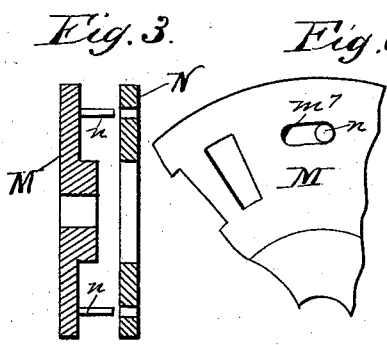
Fig. 3. Fig. 6. Fig. 7.
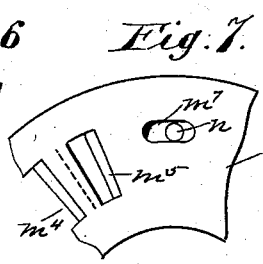
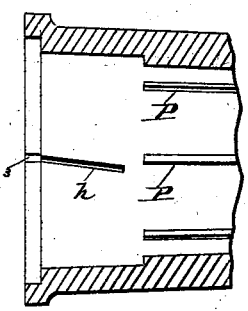
Fig. 8.
Witnesses:
Harry S. Knight.
G. M. Knight
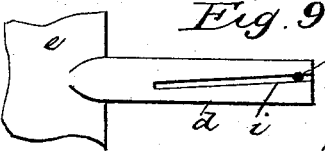
Fig. 9.
Inventor.
John H. Stich
per Wm. H. H. Knight
His Attorney.

(No Model.) 2 Sheets—Sheet 2.
J. H. STICH.
MEAT CHOPPER.
No. 537,316. Patented Apr. 9, 1895.
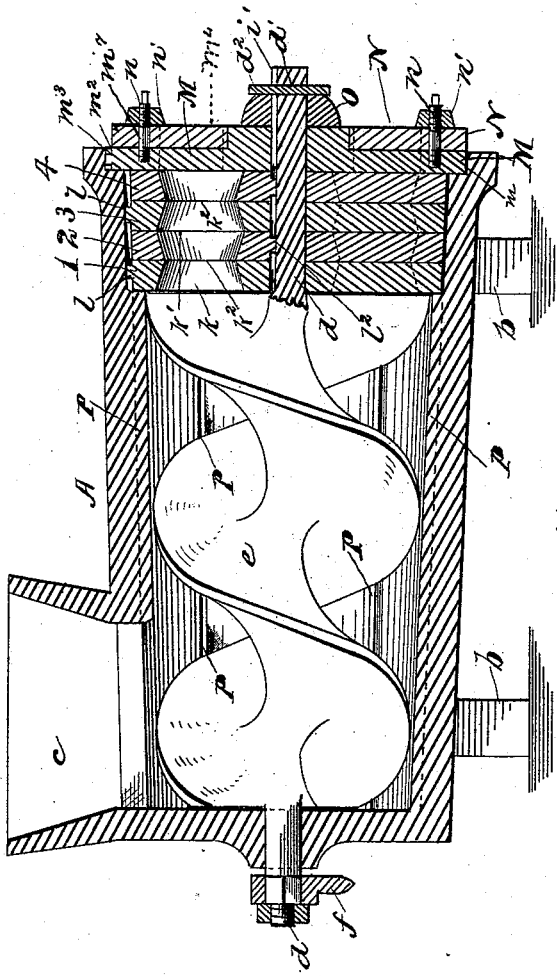
Witnesses:
H. S. Knight.
G. M. Knight
Inventor.
John Henry Stich
by W. H. H. Knight
his — Attorney.

UNITED STATES PATENT OFFICE.

JOHN HENRY STICH, OF LITTLESTOWN, PENNSYLVANIA, ASSIGNOR OF ONE-HALF TO NEVIN B. LE FEVRE AND WM. B. HORNBERGER, OF SAME PLACE.

MEAT-CHOPPER.

SPECIFICATION forming part of Letters Patent No. 537,316, dated April 9, 1895.

Application filed November 3, 1894. Serial No. 527,813. (No model.)

*To all whom it may concern:*

Be it known that I, JOHN HENRY STICH, a citizen of the United States, residing at Littlestown, in the county of Adams and State of Pennsylvania, have invented certain new and useful Improvements in Meat-Choppers; and I do hereby declare the following to be a full, clear, and exact description of the invention, such as will enable others skilled in the art to which it appertains to make and use the same.

My invention relates to improvements in meat choppers of that particular branch wherein material is to be operated upon, is moved, within a cylindrical body by a worm, or screw, to a fixed cutter secured to the head of such body, and said invention consists, first, in the provision, in a device of the class named, of fixed, and movable cutters, to the action of which, material to be cut, is subjected before reaching the fixed cutters at the head of the machine, and whereby such material is cut into a finer condition, with greater ease, and rapidity than is possible in machines not provided with such fixed and movable cutters; second, the invention consists in providing a meat cutting device with means for increasing or diminishing the discharge orifices to control the fineness of cut of material; third, the provision of means whereby the faces of the fixed and movable cutters are maintained in close contact at all times, and are thus forced to become self sharpening, and, finally, the invention consists in the construction and arrangement of the several parts of the machine for service, substantially as is hereinafter set forth, and illustrated in the accompanying drawings, in which—

Figure 1, is a side elevation, partly in section of my improved meat cutter. Fig. 2, is an end elevation thereof. Fig. 3, is a vertical section through the adjustable head, taken on the line $y, y$ of Fig. 2. Fig. 4, is a side elevation of one, of a pair of the supplemental cutters detached from the machine. Fig. 5 represents a vertical section of said supplemental cutters, taken on the line $x, x$, Fig. 4. Figs. 6 and 7, are elevations of part of the head and show the means employed to increase or decrease the discharge openings therein. Figs. 8, and 9, represent respectively portions of the body of the machine, and its operating shaft, and shows the means, whereby the supplemental cutters, are maintained in contact. Fig. 10 is a vertical, longitudinal section of my improvement, taken on the line $y, y$, of Fig. 2.

Referring to the drawings, wherein similar letters and figures of reference denote similar parts, A designates a meat chopping device, comprising a cylindrical body $a$, preferably formed of cast iron, and provided with legs or supports $b$, feed hopper $c$, opening into the interior chamber $b'$ of the device at its rear end, operating shaft $d$, upon which is formed, or secured the feed worm, or screw $e$, hand crank $f$, to move said shaft $d$, and head M, secured to the forward, free end of the body $a$.

So far as described the device is similar in construction and in operation to those in common use. I will now, however, proceed to describe my particular improvements, and their application to the device above described.

Referring again to the drawings, it will be observed, that the forward ends of the body $a$, and shaft $d$, respectively, are extended beyond the forward end of the feed worm $e$, and are each provided with key seats, or grooves $h$, and $i$, which, for a purpose, presently to be explained, are inclined, as regards the axis of the machine. See Figs. 8 and 9. Within the extension of the body, upon the shaft $d$, I mount a series of cutter heads, 1, 2, 3, 4, having apertures $k, k'$, formed therethrough. I purposely form each of such apertures, larger upon one side of each head, than upon its opposite side, and thereby obtain cutting, or sharp edges $k^2$ see Figs. 4 and 5, which operate upon the material to be cut, as will be presently explained. I provide the heads 1, and 3, upon their outer surface with outwardly projecting pins $l, l$, which enter the groove, or key seat $h$ of the body $a$, and operate to hold such heads 1 and 3, from rotation when the machine is operated. I also provide the heads 2, and 4, at their central apertures $l'$ with inwardly projecting pins $l^2$, which enter the groove $i'$, of the shaft $d$, to cause said heads 2 and 4, to move with said shaft, as will be readily understood.

By reference to the drawings Fig. 5, it will be observed that the heads 1—2—3 and 4, are so arranged that the cutting edges $k^2$, of their respective apertures $k$—$k'$, are adjacent to each other, to facilitate the cutting of the harder portions of the material to be operated upon, as will be readily understood.

I provide the forward edge of the body $a$, with an annular recess $m$, to receive a head M, and provide such head with an outwardly projecting pin $m^2$, to enter a recess $m^3$, in the body $a$ and hold said head against rotation. I also provide the head M, with a series of apertures $m^4$, for the passage of the material, and with a central aperture, to receive the shaft $d$, and about said central aperture $m^5$, I provide a boss $m^6$, about which, as a center, moves an outer plate N, which has a series of apertures, that coincide, with the apertures $m^4$, of the head M, in size and number. I also provide the plate N upon its opposite sides, with slots $m^7$, through which extend screw threaded bolts $n$, that project from the head M. See Fig. 3. Thumb nuts $n'$, placed upon the bolts $n$, bear upon the plate N, and hold said plate in any desired point of adjustment. I provide the outer end of the shaft $d$ with an aperture $d'$, to receive a pin $d^2$, to hold the head M in place on the machine. To compensate for wear, endwise, of the shaft $d$, I provide a collar O, having an inclined, or cam shaped outer face, provided with recesses, $o$, for the reception of the pin $d^2$, and with thumb leaves $d^3$, whereby it may be turned at will.

The operation of my device is as follows: Material to be operated upon is placed in the hopper $c$, and passes thence to the worm $e$, by which it is forced forward to the first of the cutters 1, which cutter, it will be remembered, is stationary. By the continued action of the worm $e$, the material is forced through the apertures $k$, in said plate 1, and is subjected to the action of the cutting edges $k^2$, of said plate 1, and the next succeeding plate 2, which latter plate, is fast to, and moves with the shaft $d$. When the apertures of plate 2, becomes filled with the material, it is plain, that the continued action, and feed of the machine will force the material from the apertures of plate 2, into those of the next succeeding plate, which is stationary, and finally through the apertures of the head M.

It will be understood that, by retarding the passage of material from the machine, a much finer cut of such material, may be obtained. Hence the exterior head plate N, may be adjusted upon the head M, to increase, or decrease the size of the apertures $m^4$, at will, and held at any desired point of adjustment, by means of the thumb nuts $n'$.

Material in the machine, is held from movement in all directions, save that of a forward movement, by means of flanges, or ribs P, which extend longitudinally of the machine. See Fig. 8.

The inclined slots or grooves $h$, $i$, in the body of the machine, and its shaft, will also operate, when said shaft is rotated, to force the cutting faces, of the heads 1—2—3 and 4 together, as will be readily understood, and thus serve to keep the cutting edges of said heads in a sharp condition.

By the above described operation of my device, it will be readily seen that hard, muscular or gristly parts contained in the material operated upon, may be readily cut, to any desired degree of fineness with ease and rapidity.

By reference to the drawings Figs. 1 and 8, it will be seen that the retaining ribs P extend in the plane of the axis of the shaft $d$, and terminate against the face of the inner cutter disk, or head 1. It will also be seen that the forward end of the feed worm $e$, is purposely made to fit closely against the inner face of said cutter, or disk 1, and that said worm therefore acts in a twofold capacity,—first, to press the material operated upon, firmly against the inner face of such cutter head, or disk, and into the apertures therein, and, secondly, as a knife to sever the portions of material, in said apertures, from the material in the cylinder. Again, from the said Figs. 1 and 8, it will be seen that the faces of the several cutter heads, or disks and the discharging head, are in close contact each with the other, and that such heads, or disks, are so arranged in relation to each other, and to the worm $e$, and discharging head, as to present alternately stationary, and movable heads. Consequently the opposite edges of the apertures, in each of the said disks, or heads, 1, 2, 3 and 4, as well as the inner edge of the apertures in the discharging head, and the forward end of the worm, operate as distinct cutters, or knives to cleanly cut the material as fine as may be desired, such degree of fineness being determined by the movement of the adjustable plate $m$, upon the discharging head.

From the above recited arrangement, and operation of the several cutter disks or heads, discharging head, and worm, and detaining ribs, it will be readily seen, that clogging, of material, is impossible in a device constructed in accordance with my improvement, while the product of such a machine is of the highest possible quality.

I do not broadly claim the combination of a worm, a discharging head, and cutters, interposed between such worm, and head, nor do I claim the adaptation of a perforated adjustable plate, to the discharging head, as I am now aware that each of such arrangements of parts is not new, but

What I claim, and desire to secure by Letters Patent, is—

1. In a meat chopper, a cylindrical body, a shaft within said body, a feed worm upon, and integral with said shaft, a perforated discharging head connected to said body, and a series of stationary, and movable perforated cutter disks, or heads upon said shaft, and means substantially as described, to hold said cutter disks, or heads in continuous contact with each other, and with the discharging head, and feed worm, as and for the purpose specified.

2. A meat chopper having a cylindrical body provided upon its interior surface, with a series of longitudinally extending detaining ribs, extending in the plane of the axis of the feed screw and an annular space, to receive a series of perforated cutting disks or heads, a perforated discharging head, connected to said body, a shaft within said body, having a worm formed integral therewith, and a series of perforated cutting disks, or heads thereon, and means substantially as described to hold said perforated cutting disks or heads, in continuous contact with each other, and with the feed worm, and the discharging head, as and for the purpose set forth.

3. In a meat chopper, a rotatable shaft, a spiral feed worm integral with said shaft, and two or more perforated cutting disks, or heads upon and rotated by said shaft, in combination with a cylindrical body having its inner surface provided with detaining ribs, extending in the plane of said shaft, two or more stationary cutting disks or heads, a stationary perforated discharging head connected to said body, and means substantially as described to maintain said cutting disks, or heads, discharging head, and feed worm, continuously in contact with each other, as and for the purpose set forth.

4. In a meat chopper, a cylindrical body, having its inner surface provided with longitudinally extending detaining ribs, and an annular space, to receive perforated cutting disks, or heads a stationary perforated discharging head, connected to said cylindrical body, and a perforated plate in contact with, and movable upon said stationary discharging head, to vary the area of openings therethrough, in combination with a rotatable shaft, within said cylindrical body, a spiral feed worm, integral with said shaft, stationary, and movable cutting disks or heads upon said shaft, and an adjustable nut upon said shaft, to maintain the discharging head, cutter disks, or heads, and worm in continuous contact, for the purpose specified.

In testimony whereof I here affix my signature in presence of two witnesses.

JOHN HENRY STICH.

Witnesses:
HOWARD F. ANGELL,
EDWARD M. CROUSE.